(12) United States Patent
Martin et al.

(10) Patent No.: US 7,398,512 B2
(45) Date of Patent: Jul. 8, 2008

(54) METHOD, SYSTEM, AND SOFTWARE FOR MAPPING AND DISPLAYING PROCESS OBJECTS AT DIFFERENT LEVELS OF ABSTRACTION

(75) Inventors: Terry M. Martin, Fort Collins, CO (US); Donna J. Grush, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 10/724,728

(22) Filed: Dec. 2, 2003

(65) Prior Publication Data

US 2005/0120332 A1   Jun. 2, 2005

(51) Int. Cl.
*G06F 9/44* (2006.01)
(52) U.S. Cl. ..................................... 717/105
(58) Field of Classification Search .................. 717/105
See application file for complete search history.

(56) References Cited

U.S. PATENT DOCUMENTS

| | | | |
|---|---|---|---|
| 5,920,870 A * | 7/1999 | Briscoe et al. .......... 707/103 R |
| 6,256,773 B1 * | 7/2001 | Bowman-Amuah ......... 717/121 |
| 6,289,382 B1 * | 9/2001 | Bowman-Amuah ......... 709/226 |
| 6,947,951 B1 * | 9/2005 | Gill ......................... 707/104.1 |
| 6,986,120 B2 * | 1/2006 | Reddy et al. ................ 717/104 |
| 7,151,438 B1 * | 12/2006 | Hall et al. .............. 340/286.06 |
| 7,295,719 B2 * | 11/2007 | Robertson et al. ........... 382/305 |

OTHER PUBLICATIONS

Software Magazine: Field Guide for IT Managers Tackling Business Priorities www.softwaremag.com; Apr. 2001/May 2001; vol. 21, Issue 2; Products.new, p. 66.
Versata: Products in the Versata Logic Suite, http://web.archive.org/web/20031204212300/www.versata.com/p, Dec. 4, 2003, (per archive.org history) 2 pages.

* cited by examiner

*Primary Examiner*—Wei Y. Zhen
*Assistant Examiner*—Phillip H Nguyen

(57) ABSTRACT

A method, system, and software for mapping and displaying process objects at different levels of abstraction includes correlating business level objects to application level objects. Source data is associated with indications for both the relevant business level objects and the application level objects and stored in a database. The stored data is displayed associated with both the business level objects and the application level objects.

22 Claims, 9 Drawing Sheets

METHOD, SYSTEM, AND SOFTWARE FOR MAPPING AND DISPLAYING PROCESS OBJECTS AT DIFFERENT LEVELS OF ABSTRACTION

BACKGROUND OF THE INVENTION

When developing or customizing a software system that provides business functionality for business users, one of the problems involves coordination between business analysts and software system analysts. Business analysts are users who are familiar with the required business functionality that the software must provide. Software system analysts design or customize software systems to provide the required business functionality. Frequently, the business analysts view the business functionality at a level of abstraction which is much higher than the level of abstraction at which the software system requirements must be specified by the software system analysts. Furthermore, once the software system has been developed and deployed, those concerned with the deployment and maintenance of the software system (typically, system administrators and/or operators) view the software system at an even lower level of abstraction than that of the system analysts.

Therefore, in the lifecycle of a software system development and deployment, there is no simple mechanism to coordinate the views of the software system for these analysts that view the software system from different perspectives and different levels of abstraction. Therefore, business analysts and software system analysts lack a convenient mechanism by which changes at one level of abstraction are correlated to changes at a different level of abstraction so that the impact of the changes at one level of abstraction can be conveniently analyzed at another level of abstraction.

In order to facilitate rapid software application development, there are tools for creating or facilitating the creation of software applications from a business perspective. These tools are typically model driven and utilize a proprietary runtime environment for the created software application. Furthermore, in many cases, the models that are used are created using proprietary modeling tools. The business rules are developed in the model and these rules together with the other model attributes may then be used to generate the high level software application logic. The tools then use the business rules and the other model attributes to generate the lower level application logic and the corresponding program code either automatically or with partial input from a system developer. However, the lower level application logic or the program code is typically not suitably connected to the higher level business model rules or artifacts at a level of detail that ties in runtime parameters and data of the software application to the business model rules and artifacts that were used to generate the software application. Therefore, there are no views to link the generated program code and the software application run time parameters to the business model artifacts and rules on an ongoing basis. That is, these tools are not designed to be used on an ongoing basis by business analysts to analyze the ongoing performance of the software application—they merely provide an interface to define business rules that are then used by a software system analyst to define and generate the lower level application logic and program code modules. These lower level application logic and program code are not tied back to the business model rules or artifacts in a meaningful way to facilitate a business level analysis on an ongoing basis during the runtime of the software application.

SUMMARY OF THE INVENTION

One embodiment of the present invention is a method of mapping and displaying process objects at different levels of abstraction, including: correlating business level objects to application level objects; associating and storing source data with indications for both the business level objects and the application level objects; and displaying the stored data associated with both the business level objects and the application level objects.

Another embodiment of the present invention is a computer readable medium having program code recorded thereon for mapping and displaying process objects at different levels of abstraction, the program code configured to cause, when executed, a computing system to perform the steps including: correlating business level objects to application level objects; associating and storing source data with indications for both the business level objects and the application level objects; and displaying the stored data associated with both the business level objects and the application level objects.

Yet another embodiment of the present invention is a system for mapping and displaying process objects at different levels of abstraction, including: means for correlating business level objects at one level of abstraction to application level objects at another level of abstraction; means for associating and storing source data with both the business level objects and the application level objects; and means for displaying the stored data associated with both the business level objects and the application level objects.

BRIEF DESCRIPTION OF THE DRAWINGS

The accompanying drawings, which are incorporated in and constitute a part of the specification, illustrate embodiment(s) of the invention, and, together with the general description given above and the detailed description of the embodiment(s) given below, serve to explain the principles of the invention.

DETAILED DESCRIPTION OF THE EMBODIMENTS

Figure 1:
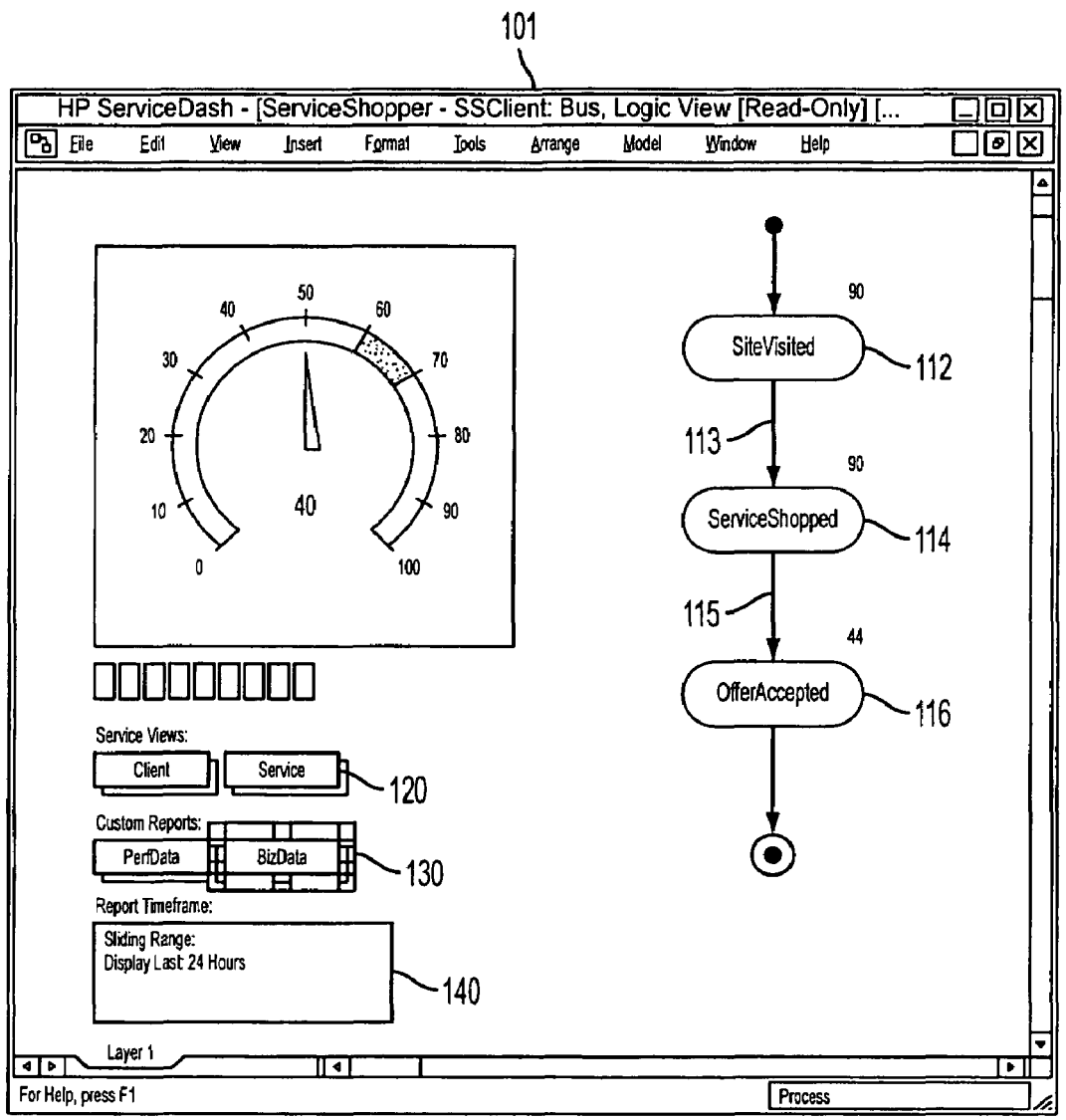
FIGS. 1-3 show views at three levels of abstraction of a business process.

A method (and related system and software) for mapping and displaying web services (or more generally, process) objects between different levels of abstraction and different views will be described. For example, a new business trend in the development and deployment of software systems and applications is to use web service applications that implement the front end business functionality provided by a software system and/or application. As is well known to those skilled in the software art, examples of business functionality include inventory management, sales management, customer service, enterprise resource management or human resources management. It should be understood that these examples are provided for illustrative purposes only and are not intended to limit the scope of any of the embodiments of the present invention. These software systems or applications act as front ends to legacy applications and other web services. As is well known to those skilled in the software art, legacy applications are generally back end processing applications that were developed in the past to provide processing functionality often using a mainframe class computer.

Business analysts monitor the high level business processes implemented by the web services or other front end applications while the system analysts or other technical personnel monitor the lower level processes that implement the high level business processes. For example, business analysts may monitor sales patterns from particular locations or track and adjust inventory related processes based on the sales patterns. The system analysts or other technical personnel may monitor loads or adjust capacity for the system services or adjust the low level software modules and their interactions to improve system performance or response times.

Certain embodiments of the present invention are described below with reference to drawings. These drawings illustrate certain details of specific embodiments of the systems, methods, and programs of these embodiments. However, describing embodiments of the invention with drawings should not be construed as imposing on the invention any limitations that may be present in the drawings. Various embodiments of the present invention contemplate methods, systems, and program products on any computer readable media for accomplishing its operations. Some embodiments of the present invention may be implemented using an existing computer processor, or by a special purpose computer processor configured for this or another purpose.

As noted above, embodiments within the scope of the present invention include program products on computer-readable media and carriers for carrying or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Some embodiments of the invention has been described in the general context of method steps which may be implemented, for example, by a program product including computer-executable instructions, such as program modules, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Certain embodiments of the present invention are suitable for being operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

As discussed earlier, one embodiment of the present invention in general enables data collected about the web services (or processes) to be displayed in a context familiar to each of the stake holders and provides a map to navigate between the different levels of abstraction that are appropriate to the respective stakeholders.

For example, three levels of abstraction may include: (1) a high level view that may represent the business model/business processes implemented by a web service or application; (2) a lower level view that may depict the web service or application and its interactions; and (3) a further lower level view that may be a decomposition of the components within a given web service or application, and their internal interactions. Each of these views represents a different view or "model" of the same system. In general, the high level models provide a system functionality summary and the lower level models provide a more detailed view of the components that provide the functionality summarized in the high level model. By providing links between the components in each model, data collected corresponding to model components at a lower level is mapped to corresponding model components at higher levels. Users are then able to view summary data in the high level models and then "drill down" to view more detailed breakdowns of the summary data in the lower level models.

As used in the present application, a "model" is a representation (for example, a visual representation) consisting of one or more nodes for which relevant data is available. These nodes may represent, for example, abstract business functionality (in a higher level model), a web service or software application (at a lower level model), or a software program module, such as an Enterprise Java Bean (EJB) module (in a further lower level model). Arcs depict interconnections between the nodes and represent, for example, logical relationships or system calls between the nodes. The nodes and arcs are also collectively referred to as model objects. Furthermore, in various embodiments of the present invention, these model objects may be implemented as objects in an object oriented software design and development paradigm.

As implied earlier herein, models may be related to each other in a hierarchical relationship. Therefore, a business process may be modeled at several levels of abstraction, for example, a high level business process model, a lower level application model, and a further lower level component model. In one example, the top-level business model may represent an abstract, implementation independent view of an entire system. The entire system business model view may then be linked to one or more web service or application models that depict the actual web services (or applications) in the system and their interactions. Each web service in the web service model may then be linked to a lower third level view which may show the low level components that make up that web service.

Likewise, the data collected may also be abstracted and correlated to the models at the different levels. The unprocessed data may be collected from many sources (for example, SOAP messages, web page HTTP traffic, business databases, agents, log files). The data is then normalized to a consistent standardized form. For example, in some embodiments of the present invention, the processed data is identified by time, session, and parameter type in order to be mapped and correlated to relevant nodes in the models at each of the levels. Additional information, such as the data source, may also be captured and stored in a database while being linked to the relevant nodes in the models in each of the abstraction levels. Finally, calculated, abstracted, or derived values may also be computed and mapped to the nodes and arcs of the models. One skilled in the art would recognize that the computed or derived values could be periodically calculated and stored in a database or, in the alternative, they could be calculated and derived when required. For example, these derived values may have value to a business analyst while the raw data (or data at a lower level of abstraction) may have value to system or technical personnel (for example, raw data of page hits may have more meaning to web and system administrators).

At run time of the system, the data is collected, processed, and stored in a normalized or standardized format in a database. One skilled in the art would recognize that the database referred to herein is a logical database. Physically, the database may simply be a flat file or may be a distributed database that is accessible in an integrated manner by a suitable interface. The data may be collected by interfacing with various tools and instrumentation, for example, Hewlett Packard's (HP) Openview's Web Transaction Observer (WTO) or Measureware, Conversation Tracker, etc. The collected data of interest can be mapped at a session level or could be mapped to particular steps within a session in which the data is collected. Furthermore, the collected data could be mapped to more than one model or to more than one object within a model. For example, the collected data may be mapped to a web service at one level in a model hierarchy and also to a component of that web service in a lower level of the model hierarchy. Likewise, a data source typically may collect data from more then one component (for example, a web log or WTO log on a host machine may contain data about multiple components on that host) and a particular component's data can be identified within that data source.

It is contemplated that various embodiments of the present invention will work with application components running on a single host or on multiple hosts as long as data from each of the hosts is collected and processed as described herein. Likewise, user session identification information (id's) could be collected across the different data sources and correlated together to determine parameters related to a user or a user session. In one embodiment, it is assumed that all the data collected for a component applies to the process that was modeled although it is possible that other processes may also be using the same component. It is also possible that the data collected for a component used by multiple processes could be allocated on some basis between the multiple processes that were using the same component. For example, one such a basis for allocating data to a particular process could be the time at which the particular process was instantiated or the time duration for which the particular process was active or running.

A display controller may then be used to filter and process data for display on selected parameters, such as moving time frames (for example, last twenty four hours), selected web services (phone service only), or specific user sessions.

Figure 2:
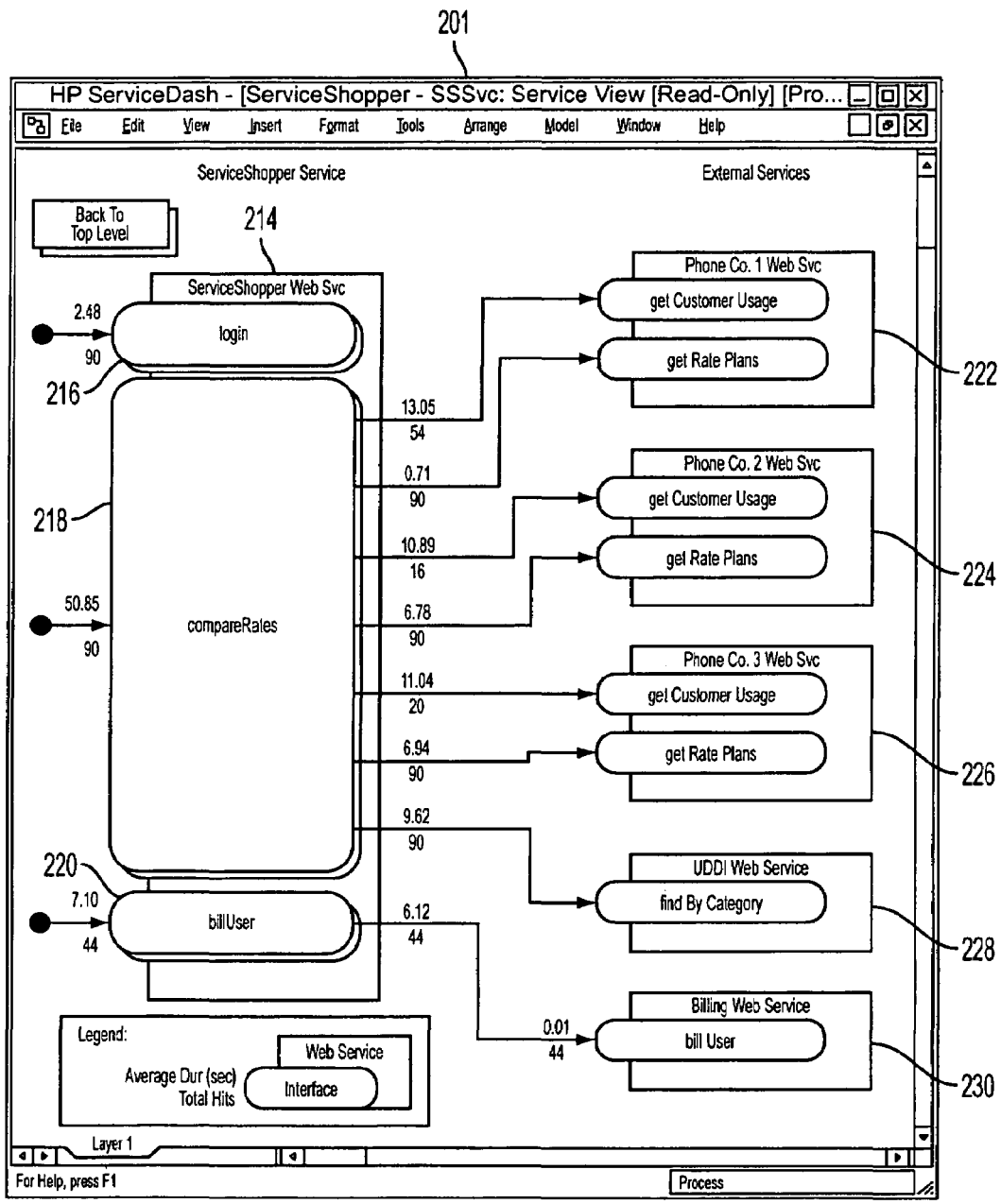
Figure 3:
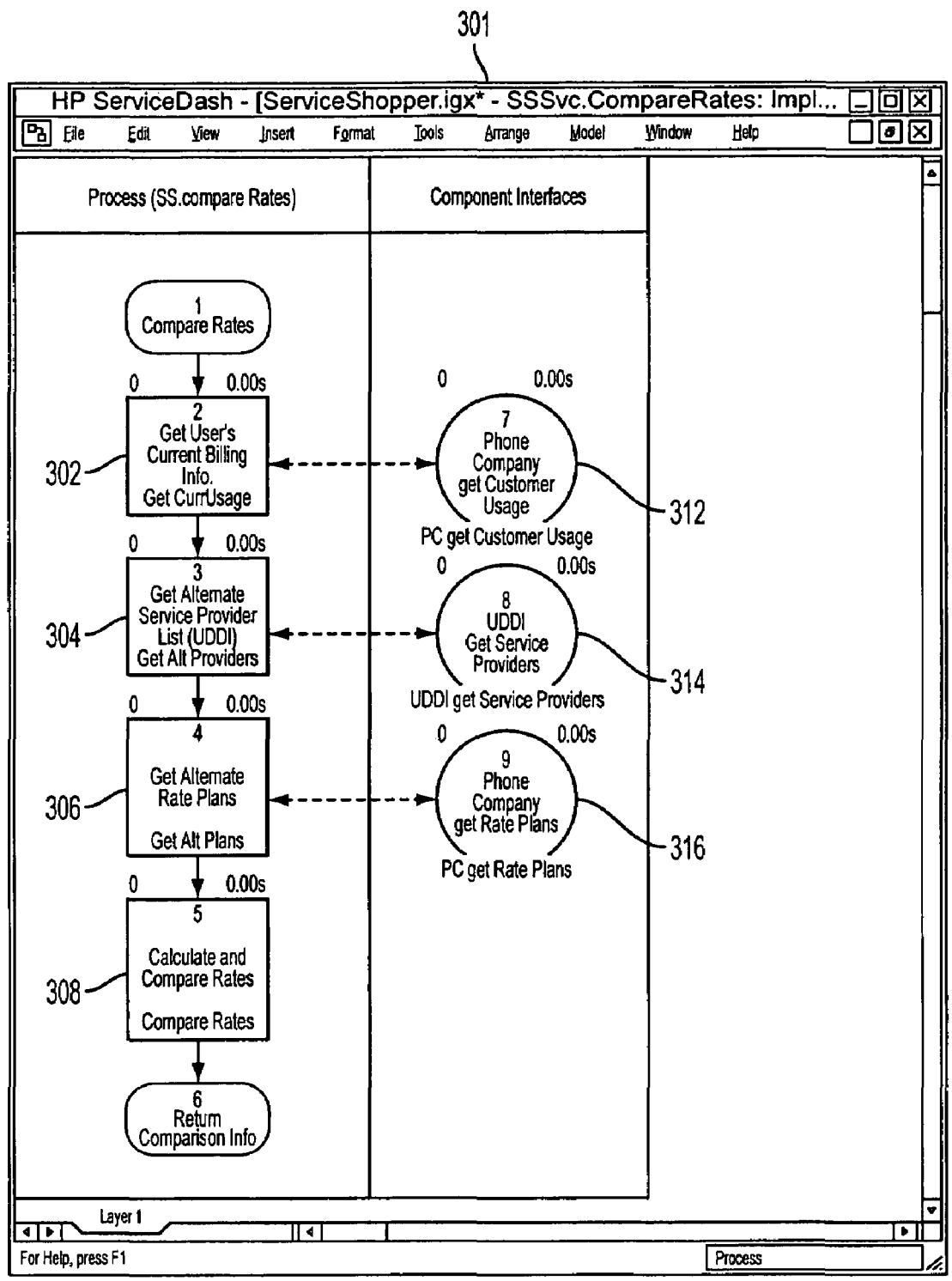

With reference to the drawings, FIGS. 1-3 show views at three levels of abstraction of a business process. FIG. 1 shows a business level view 101 of a business model that may be of interest, for example, to business analysts or other users that are interested in data at a higher level of abstraction. In the business level view 101, the nodes 112, 114, and 116, are connected by arcs 113 and 115 which connect the nodes 112 and 114 and nodes 114 and 116, respectively. Therefore, as seen in FIG. 1, node 112 represents an object that displays an aggregate session total of the number of visitors to a system in a session. Node 114 represents an object that shows the number of visitors that visited, for example, a particular web service (ServiceShopped) on the visited system. Node 116 represents an object that shows the number of sale offers accepted by those who visited the ServiceShopped service on the system. Element 120 in the business level view 101 shows that a user has the option to select between at least two types of views—a service view that shows details relevant to the web services and a client view that displays information relevant to clients' activities or web based interactions. Element 130 provides a user with flexibility regarding the type of data to be used in generating a report. The "PerfData" indicator means performance data and relates to operational data regarding the web based interactions or the server related performances. The "BizData" indicator means business data and relates to the business processes or application components that implement the functionality of the business processes. Finally, element 140 provides a user the option to adjust a report time frame. For example, as shown in FIG. 1, the user may select that the report timeframe should span a sliding range, for example, cover the last twenty hours by reference to a current date and time.

FIG. 2 illustrates the web service level 201 (or lower level) view of a lower level model that implements the business model objects discussed in FIG. 1 earlier. Therefore, the "ServiceShopper" web service 214 represents one service or application that implements the ServiceShopped node 116 discussed with reference to FIG. 1. It should be understood that each object at a higher level model may be implemented by one or more objects at a lower level model. Therefore, it should be understood that other objects at the web services or application level models could also be used to implement the ServiceShopped object 116 which is an object in a higher level business model. The ServiceShopper web service 214 includes objects representative of application components Login 216, CompareRates 218, and BillUser 220. As shown in FIG. 2, the CompareRates 218 application component interacts with four other web services to retrieve the information needed to perform the functionality of the compareRates 218 application component. These exemplary web services include the Phone Co. 1 web service 222, the Phone Co. 2 web service 224, the Phone Co. 3 web service 226, and a UDDI web service 228 (UDDI being a web service standard). The compareRates 218 application component has the business logic to retrieve and compare rates from the four web services 222-228 that provide it with pricing information. Thereafter, once the user selects one of the services based on the comparative information provided by the compareRates 218 application component, the ServiceShopper 214 web service invokes the BillUser 220 application component that generates a bill for the user for the payment that is now due to the service provider of the service selected by the user. The BillUser 220 application component then interacts with the Billing web service 230 to generate the bill for the user.

FIG. 3 illustrates the next lower level component view 301 of a next lower level model that implements the compareRates 218 web service shown in the web service level model view 201. The lower level components 302-308 implement the compareRates 218 web service component and interact with external lower level components 312-316 as shown in FIG. 3. Therefore, FIGS. 1-3 provide one example of a high level business model view 101 being correlated to a lower level web service model view 201 which in turn is correlated with a lower level component model view 301. Furthermore, the objects within the models are related to other objects in the same model as well as to objects in the other hierarchically related models.

Figure 4:
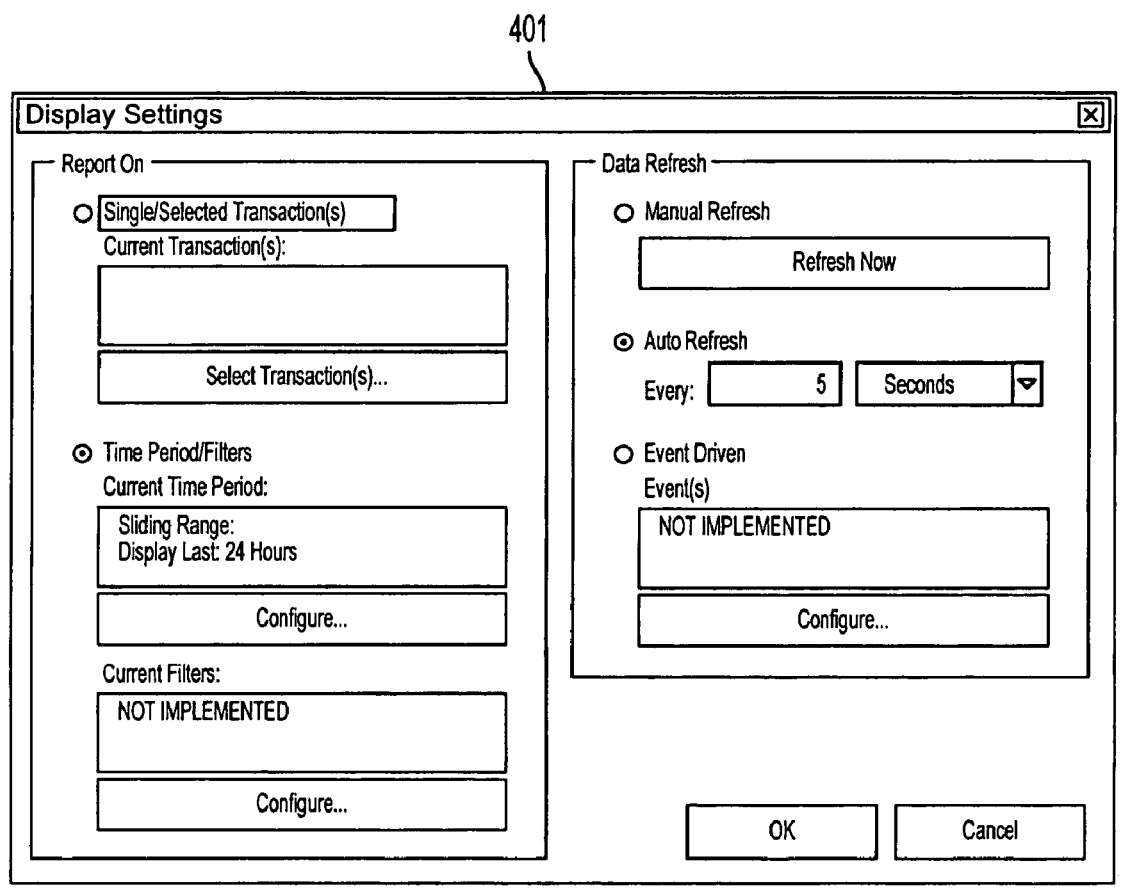
FIG. 4 illustrates a display controller.

FIG. 4 illustrates a display controller 401 that allows a user to control the parameters for information to be displayed or printed in a report. The display controller 401 may be used to display data correlated to the objects in the models discussed herein. As shown in FIG. 4, the user can specify that the report be generated for a time period based filter, for example, for a rolling twenty four hour period. Alternatively, the user can specify that a single selected transaction be used for the report. Likewise, the user can also specify the data refresh basis—whether the data should be manually refreshed, automatically refreshed on a periodic basis, or refreshed on an event driven basis. In this way, the user has considerable flexibility in viewing the data by specifying the parameters for generating a report.

Furthermore, as would be apparent to those skilled in the art, the reports could be generated from information correlated to objects in models corresponding to any of the levels of abstraction of the business process. For example, a business analyst could generate reports correlated to the business model objects while a system designer or analyst could generate reports corresponding to application/web service model objects while system administrators and other technical personnel could generate reports corresponding to lower level application component objects. It would be very easy to see the impact of a change made at one level on the other levels of abstraction of the business process objects. For example, the results of a change made at the application or application component level (for example, adding or removing a host from executing an instance of an application) could be easily investigated with respect to its impact at the business process level (for example, an increase or decrease in the web response time for a web based interaction or even the increase or decrease in the percentage of closed sales).

Figure 5:
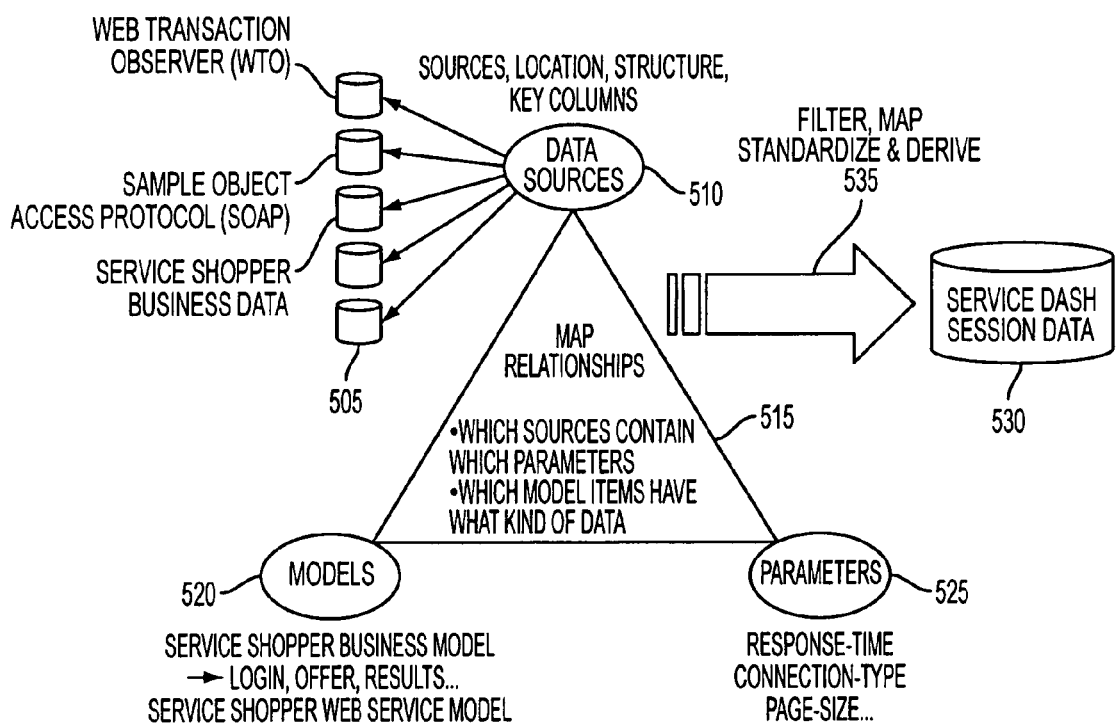
FIG. 5 illustrates an exemplary data relationship and management in certain embodiments.

FIG. 5 illustrates an exemplary data relationship and management in accordance with certain embodiments of the present invention. The data may be received or collected from a wide variety of sources including a wide variety of application level data as well as operational data that are received by a data source interface 510 that interfaces to the relevant data sources 505. Examples of the data sources 505 that provide data to the data source interface 510 include web server related data, for example, from web logs or from a product such as a Web Transaction Observer provided by HP's Openview tool. The data sources 505 include data provided from other applications and systems, for example, by using a standard protocol such as Simple Object Access Protocol (SOAP) or according to the Common Object Request Broker Architecture (CORBA) architecture. Finally, the data sources 505 include the application or business data generated by the applications or web services represented in the model hierarchy under analysis.

A mapping process 515 maps the source data from the data sources 505 for a business process to the models at the various hierarchy levels of the business process that are stored in a model repository 520. The source data is mapped to the relevant corresponding object(s) in each of the models in each of the levels of the model hierarchy before being converted and stored in a data conversion/storage unit 530. Therefore, in one example, the model repository 520 contains models at all the levels of the model (or abstraction) hierarchy and the objects at each of the levels are correlated to objects at each of the other levels either directly or indirectly (i.e., through objects at other levels). Accordingly, in one example, the model repository 520 contains the business level model objects, the application level model objects, and the application component level model objects arranged in a hierarchical relationship from a higher level of abstraction to a lower level of abstraction. In the example, discussed earlier herein with respect to FIGS. 1-3, the model repository would contain at least a representation of the ServiceShopper business level model (FIG. 1), the ServiceShopper web service application model (FIG. 2), and the application component level model (FIG. 3).

The mapping process 515 can also use an optional parameters file 525 that provides information as to the source data that needs to be tracked and stored. For example, in one example, the parameters file 525 could contain parameters that indicate that the source data that needs to be tracked include the response time, the connection type, or the page size of a web enabled application. The parameters in the parameters file 525 would typically be provided by the users using a user interface. Providing such an user interface for this purpose is within the abilities of one skilled in the art.

The source data is then filtered and/or converted (or normalized or standardized) to a standard format in a filtering/conversion step 535 and then stored in the data conversion/storage unit 530. As discussed herein, the filtering/conversion performed in the filtering/conversion step 535 includes program logic that may be preprogrammed to generate output data in a standard format and/or determine which data is to be filtered and converted based on parameters in the parameters file 525 that may be provided by the users either directly or indirectly. Furthermore, the parameters file 525 could also be used to indicate a preferred standardized format when several standardized formats may be available for use. Furthermore, in various embodiments of the invention, the standardized data format includes an indication of the one or more model objects that a particular data entry in the data conversion/storage unit 530 relates to. As would be clear from the earlier discussion herein, a particular data entry could be related to several objects in a hierarchy of models corresponding to a business process. Furthermore, the relationship of a particular data entry to the various objects in the hierarchy of models could also be determined based on the relationships within the model hierarchy stored in the model repository. Therefore, for example, the source data could be stored correlated to an object at the lowest relevant level of the model hierarchy. The correlation of that source data to the other objects in the model hierarchy could then be derived based on the relationship of the model objects stored in the model repository.

Figure 6:
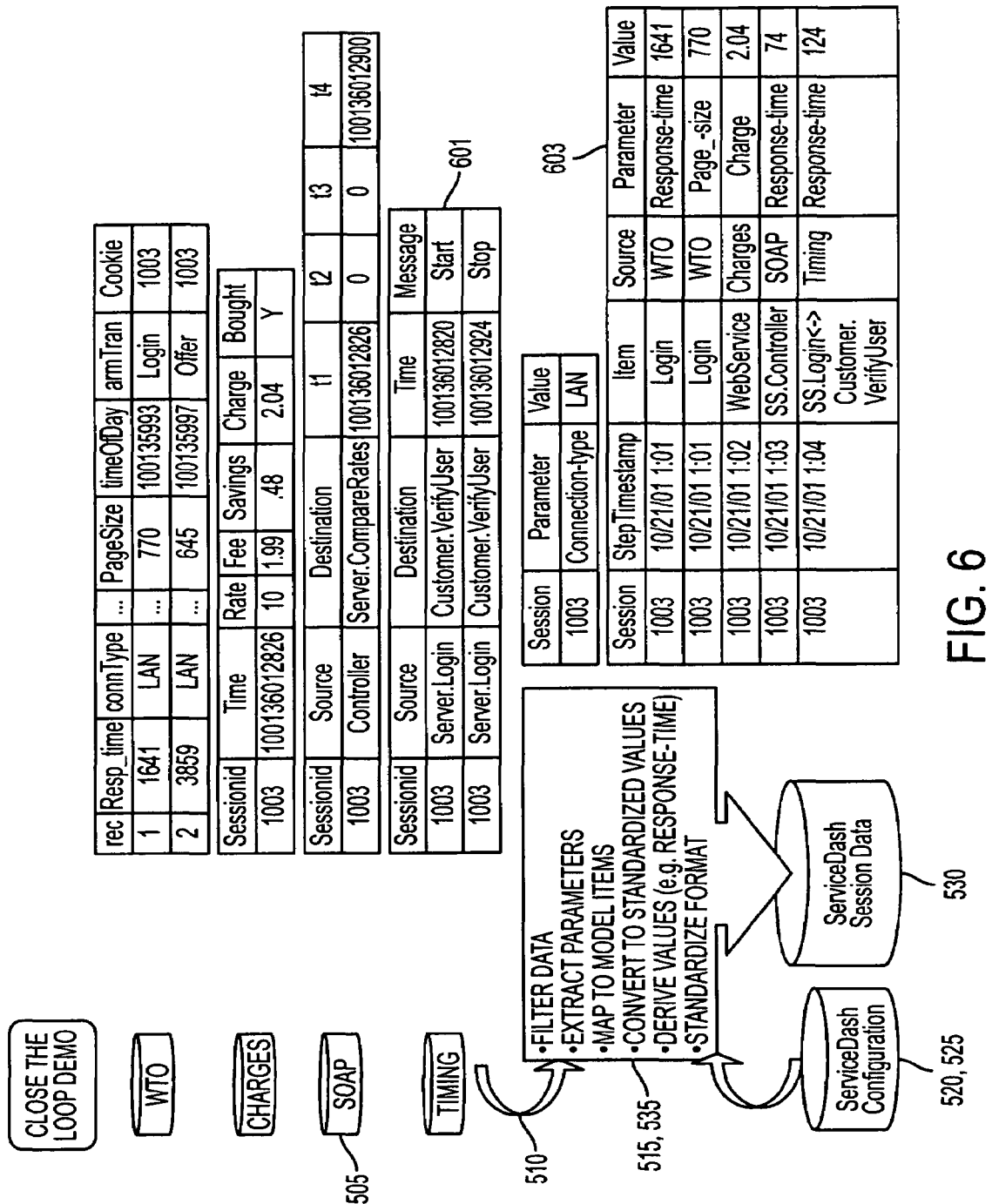
FIG. 6 shows one example of the results of a filtering/conversion step.

FIG. 6 shows one example of the results of the filtering/conversion step 535. Input source data 601 from a variety of data sources 505 (for example, received through the data source interface 510) is converted into a standardized format 603 and stored in the data conversion/storage unit 530 so that data from the various sources can be subsequently queried in the standard format 603. As discussed earlier, source data is first mapped to appropriate model objects by the mapping process 515 before the conversion and/or filtering process 535 converts the data into a normalized or standardized form for storage in the data conversion/storage unit 530. The conversion and/or filtering process 535 can be influenced or specified by a user either directly and/or by specifying parameters in the parameters file 525. Therefore, the data that is stored in the data conversion/storage unit 530 is correlated to the relevant model objects that are stored in the model repository 520 and are normalized or standardized based on, among others, the parameters that are specified in the parameter file 525. Accordingly, the data stored in the data conversion/storage unit 530 can be queried for reports or views at the various levels of abstraction represented by the various levels of models stored in the model repository 520. It should be recognized that while the various databases shown herein are logically distinct, they could physically be located on one computing system or network.

Figure 7:
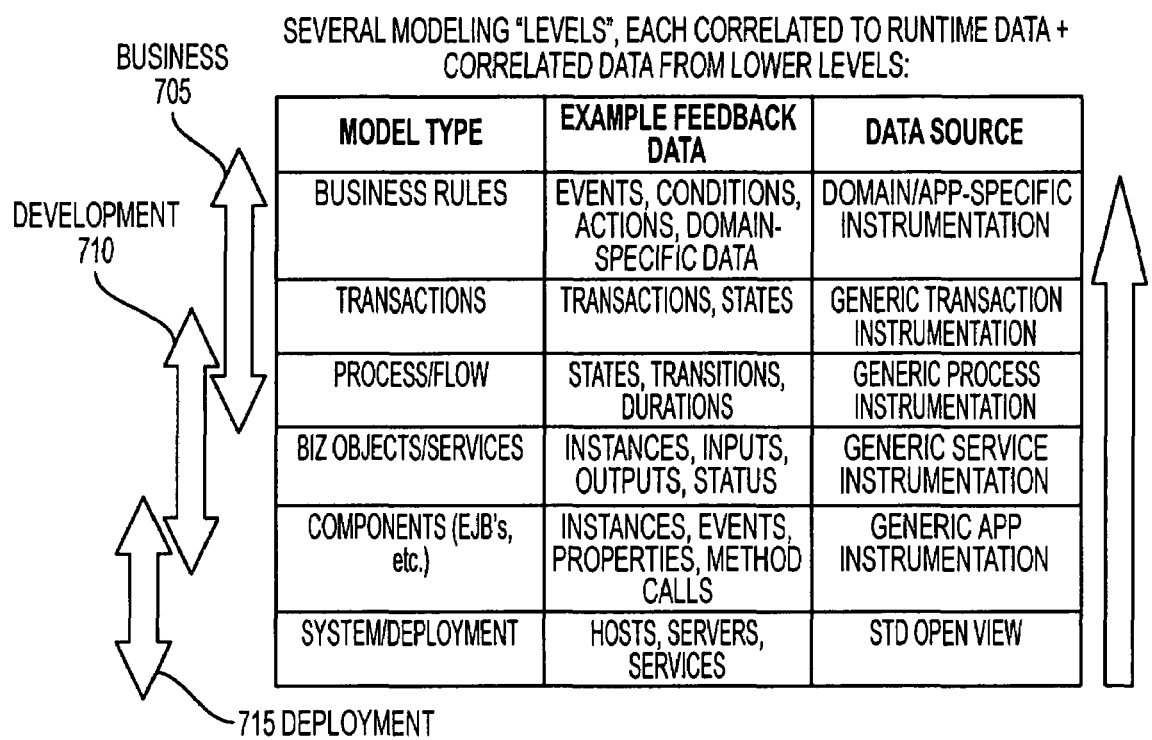
FIG. 7 is a diagram that illustrates several modeling levels.

FIG. 7 is a diagram that illustrates the several modeling levels that may be stored in the model repository 520, i.e., one or more models may be stored at each of these modeling levels. As seen in the figure, some of these model levels may of interest to more than one group of users that are interested in the system implementation of a business process. For example, business users (including business analysts) 705 may be interested in business models representative of business rules, transactions, and process flows. Users interested in system development 710 (system analysts and the like) may also be interested in models representative of transactions and process flow and in addition could be interested models representative of the software applications (web services being one example) and the components that implement the software applications. Users interested in the deployment 715 of the system (including, for example, system administrators and operators) could also be interested in the models representative of the software applications and their components and in addition would be interested in the models representative of deployment related issues (such as servers, databases, redundancy, reliability, etc.). FIG. 7 also illustrates exemplary feedback data that may be correlated to the models at the various levels as well as typical data sources from which the feedback data may be received or derived.

Figure 8:
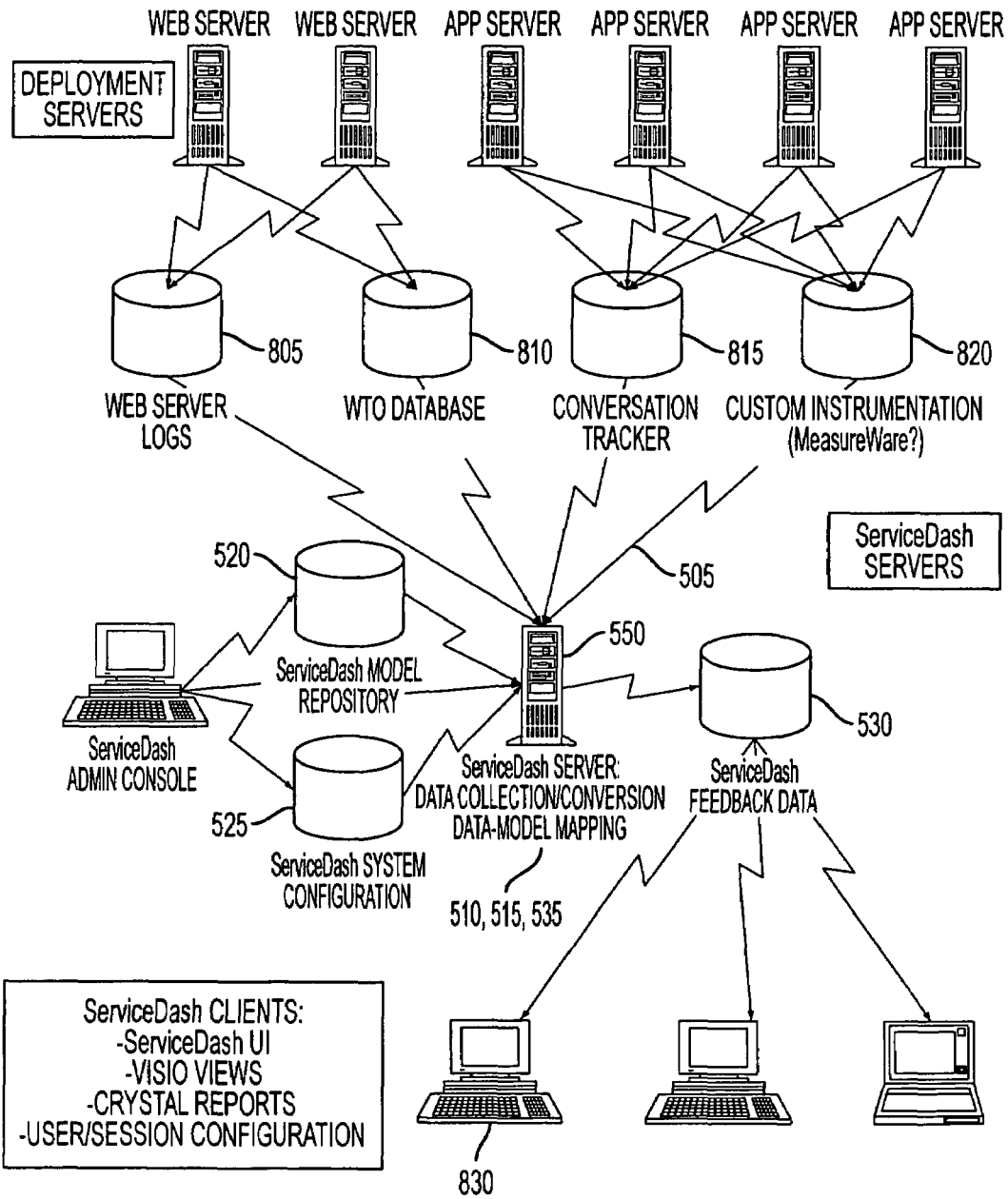
FIG. 8 is a system diagram illustrating one embodiment of the present invention.
Figure 9:
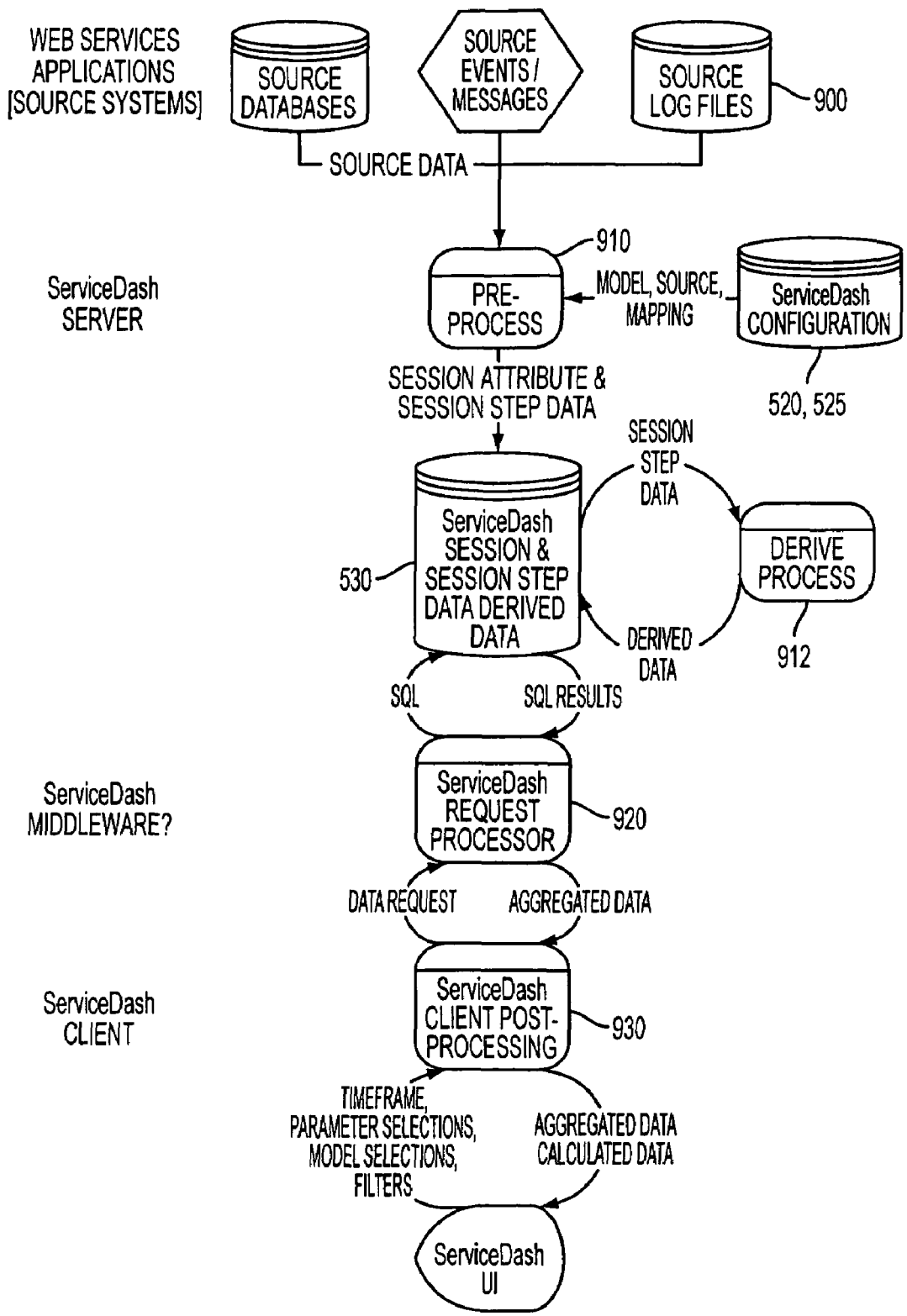
FIG. 9 is a flow diagram that illustrates a process flow of one embodiment of the present invention.

FIG. 8 is a system diagram and FIG. 9 is a flow diagram that illustrates one embodiment of the present invention. In step 900, the source data is received from various data sources 505 as discussed earlier herein. The receipt of data from the various data sources could be initiated by various means, for example, by the occurrence of certain events. Alternately, the data sources could provide data on a real time or near real time basis or the data sources could provide data on a batch basis. Finally, the one or more of the data sources could also provide data using some combination of all of these means.

Various exemplary sources for the source data are shown in FIG. 8. For example, the operational data (for example, web interaction related data) could be received or extracted from web logs 805 and/or a database maintained by a system management tool, such as a WTO database 810 provided by the HP Openview system management tool. Other operational data could relate to server loads or response times or other operational parameters that may be useful to any of the diverse users of the system. Application related data (for example, business data such as price or quantity) is received from custom or commercial tools that collect such data or may be sent directly by the business applications themselves. Some of the tools that may be used to collect the application related data include, for example, a conversation tracker 815 or a custom instrumentation 820 that may be provided by (or adapted from) commercial vendors or be developed specifically for this purpose.

In step 910, the source data is received at a server 550 which hosts several components of the system including the data source interface 510. One skilled in the art would recognize that the while the server 550 is shown as a single server, it could also be implemented using a bank of servers or even distributed servers that are configured to provide the functionality discussed herein. The source data received by the data source interface 510 is preprocessed or mapped with reference to the relevant model objects stored in the model repository 520 and the configuration parameters stored in the parameter configuration file 525 as discussed earlier herein. For example, the preprocessing step 910 selects the data of interest based on the relevant models in the model repository and the type of data requested by the users as specified in the parameters file 525. The data is then normalized or standardized (i.e., converted) and stored in the data conversion/storage unit 530 by processes 535 executing at the server 550. Therefore, some of the processes executing at the server 550 include the data source interface 510 (which receives the data from the various data sources 505), the mapping process 515 (which maps the received source data to relevant objects of the models stored in the model repository 520), and the filter and conversion process 535 that filters and standardizes the data stored in the data conversion/storage unit 530. Furthermore, as shown in step 912, a derive process (which could be part of the filter and conversion process 535 executing on the server 550) also generates derived data from the raw data or from the data correlated to the model objects (i.e., raw data tagged with indicators indicative of relevant objects in the models in the model repository) received from the data sources. The derived data could also be stored in the data conversion/storage unit 530. As an example, in step 900, the data sources could provide raw data indicative of the start time and the end time for a particular process' execution and the derive process step 912 could then calculate the length of time for which the process executed and this derived value could be stored in the data conversion/storage unit 530. Storing the derived data provides the advantage of more rapid retrieval of the derived data if the derived data were to be frequently requested or if the derivation computation required multiple data accesses.

In steps 920 and 930, a user 830 interacts with the standardized data stored in the data conversion/storage unit 530 so that custom reports or displays can be generated for the users. In step 920, a request processor accepts all user queries and interacts with the data conversion/storage unit 530 to retrieve data requested by the users. In step 930, client specified post processing (for example, calculations, aggregations, statistical analysis) could be performed so that data could be presented to a client in a manner most useful to the client. Also, as discussed earlier herein, the data in the data conversion/storage unit 530 is stored with indications of the various relevant objects of the all the relevant models that are stored in the model repository 520. Accordingly, in process steps 920 and 930, data can be generated for users that correlate to each level of abstraction of a business process for which a model is provided. For example, data could be provided correlated to a business model for business analysts, or correlated to an application model for application developers, or correlated to a system deployment or application component model for administrators and others concerned with system deployment.

In certain embodiments of the present invention, the data in the data conversion/storage unit 530 can be used for analyzing the impact on processes at the different levels of abstraction of a business process so that the ripple impact of a single change (or a group of changes) can be effectively studied at each of the levels of abstraction. That is, the impact of a change at the high level business process level (or business model level) can be easily viewed or analyzed at the other levels of abstraction. That is, the system developers are able to view impact of the changes at the application model level while the system administrators and others are able to view the impact of the same changes at the application component model or system deployment model level.

Some of the advantages provided by certain embodiments include: (1) bridging the conversation gap between people skilled at different levels of abstraction of a business process that need to work together; (2) not requiring separate configuration or time/data synchronization since data is stored in normalized or standardized form; and (3) providing views at different levels of abstraction of a business process, so that users at one level of abstraction are able to assess the impact of any changes at that level of abstraction on the other levels of abstraction without necessarily coordinating with users that are primarily interested in the other levels of abstraction.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of mapping and displaying process objects at different levels of abstraction, comprising:

correlating business level objects to application level objects and correlating application level objects to data/observer level objects;

associating and storing source data with indications for both the business level objects, the application level objects, and the data/observer level objects; and displaying the stored data associated with the business level objects, the application level objects, and the data/observer level objects, wherein the business level objects, the application level objects, and the data/observer level objects are respectively stored and displayed on a display as a plurality of nodes at different levels of abstraction, with correlations between the application level objects the business level objects, and the data/observer level objects being accomplished by linking one or more nodes of the application level objects to one or more nodes of the business level objects and by linking one or more nodes of the application level objects to one or more nodes of the data/observer level objects at different levels of abstraction, and wherein the source data is linked to one or more of the plurality of nodes:

wherein the step of displaying the stored data associated with business level objects, the application level objects, and the data/observer level objects comprises automatically generating alerts or reports based on predetermined criteria, and wherein the step of displaying the stored data associated with the business level objects, the application level objects, and the data/observer level objects comprises:

displaying, on a first display screen, one or more of the business level objects as lines connecting icons that are displayed on the first display screen; and displaying, as lines connecting icons that are displayed on a second display screen when one of the lines connecting icons on the first display screen is selected by a user, one or more of the application level objects that are correlated with the one or more of the business level objects, wherein the business level objects, the application level objects, and the data/observer level objects are correlated with each other by way of the lines connecting icons on the display.

2. The method according to claim 1, wherein the step of correlating business level objects to application level objects comprises correlating objects at two or more levels of abstraction, wherein the business level objects corresponds to one level of abstraction and the application level objects corresponds to another level of abstraction.

3. The method according to claim 2, wherein the application level objects are further correlated to application component level objects at another level of abstraction.

4. The method according to claim 1, wherein the source data comprises application related data and operational data.

5. The method according to claim 4, wherein the application related data comprises data correlated to components of the application level objects.

6. The method according to claim 5, wherein the data correlated to the application level components comprises data collected by an application conversation tracking tool or a custom designed instrumentation for measuring related data.

7. The method according to claim 4, wherein the operational data comprises web session data or server related data.

8. The method according to claim 7, wherein the web session data comprises response times for web based interactions and the server related data comprises server load data.

9. The method according to claim 8, wherein the response times for web based interactions are correlated to application component level objects, application level objects, and business level objects.

10. The method according to claim 1, wherein the step of displaying the stored data associated with the business level objects, the application level objects, and the data/observer level objects comprises filtering and/or aggregating the stored data responsive to a user's query.

11. The method according to claim 1, wherein the predetermined criteria comprise one of a number of users accessing an object at any level of abstraction, a response time for web based interaction, or a termination of a user session at a particular point in a web based interaction, the method further comprising:

displaying, as lines connecting icons on a third display screen when one of the lines connecting icons on the second display screen is selected by a user, one or more of a lower level of application level objects that are correlated with the one or more of the application level objects displayed on the second display screen.

12. A storage device having program code recorded thereon for mapping and displaying process objects at different levels of abstraction, the program code configured to cause a computing system to perform the steps comprising:

correlating business level objects to application level objects and correlating application level objects to data/observer level objects;

associating and storing source data with indications for the business level objects, the application level objects, and the data/observer level objects; and displaying the stored data associated with the business level objects, the application level objects, and the data/observer level objects, wherein the business level objects, the application level objects, and the data/observer level objects are respectively stored and displayed on a display as a plurality of nodes at different levels of abstraction, with correlations between the application level objects, the business level objects, and the data/observer level objects being accomplished by linking one or more nodes of the application level objects to one or more nodes of the business level objects and by linking one or more nodes of the application level objects to one or more nodes of the data/observer level objects at different levels of abstraction, and wherein the source data is linked to one or more of the plurality of nodes, wherein the step of displaying the stored data associated with the business level objects, the application level objects, and the data/observer level objects comprises automatically generating alerts or reports based on predetermined criteria, and wherein the step of displaying the stored data associated with the business level objects, the application level objects, and the data/observer level objects comprises:

displaying, on a first display screen, one or more of the business level objects as lines connecting icons that are displayed on the first display screen; and displaying, as lines connecting icons that are displayed on a second display screen when one of the lines connecting icons on the first display screen is selected by a user, one or more of the application level objects that are correlated with the one or more of the business level objects, wherein the business level objects, the application level objects, and the data/observer level objects are correlated with each other by way of the lines connecting icons on the display.

13. The storage device according to claim 12, wherein the step of correlating business level objects to application level objects comprises correlating objects at two or more levels of abstraction, wherein the business level objects corresponds to one level of abstraction and the application level objects corresponds to another level of abstraction.

14. The storage device according to claim 13, wherein the application level objects are further correlated to application component level objects at another level of abstraction.

15. The storage device according to claim 12, wherein the source data comprises application related data and operational data.

16. The storage device according to claim 15, wherein the application related data comprises data correlated to components of the application level objects.

17. The storage device according to claim 16, wherein the data correlated to the application level components comprises data collected by an application conversation tracking tool or a custom designed instrumentation for measuring related data.

18. The storage device according to claim 15, wherein the operational data comprises web session data or server related data.

19. The storage device according to claim 18, wherein the web session data comprises response time for web based interactions and the server related data comprises server load data.

20. The storage device according to claim 19, wherein the response times for web based interactions are correlated to application component level objects, application level objects, and business level objects.

21. The storage device according to claim 12, wherein the step of displaying the stored data associated with the business level objects, the application level objects, and the data/observer level objects comprises filtering and/or aggregating the stored data responsive to a user's query.

22. The storage device according to claim 12, wherein the predetermined criteria comprise one of a number of users accessing an object at any level of abstraction, a response time for web based interaction, or a termination of a user session at a particular point in web based interaction, the method further comprising:

displaying, as lines connecting icons on a third display screen when one of the lines connecting icons on the second display screen is selected by a user, one or more of a lower level of application level objects that are correlated with the one or more of the application level objects displayed on the second display screen.

* * * * *

UNITED STATES PATENT AND TRADEMARK OFFICE
CERTIFICATE OF CORRECTION

PATENT NO. : 7,398,512 B2  Page 1 of 1
APPLICATION NO. : 10/724728
DATED : July 8, 2008
INVENTOR(S) : Terry M. Martin et al.

It is certified that error appears in the above-identified patent and that said Letters Patent is hereby corrected as shown below:

In column 11, line 53, in Claim 1, after "objects" insert -- , --.

Signed and Sealed this

Twenty-first Day of October, 2008

JON W. DUDAS
*Director of the United States Patent and Trademark Office*